Patented July 22, 1941

2,249,767

UNITED STATES PATENT OFFICE 2,249,767

METHOD OF MAKING AEROGELS

Samuel S. Kistler, Worcester, Mass., assignor to Monsanto Chemical Company, St. Louis, Mo., a corporation of Delaware No Drawing. Application July 3, 1937, Serial No. 151,970

3 Claims. (Cl. 252—273)

This invention relates to the manufacture of aerogels and particularly to a method for forming the aerogel more easily and economically.

One of the objects of this invention is the provision of a method for removing the liquid present with the gel under conditions such that and in a manner so that more accurate control of the process may be attained, thus yielding a more uniform product and, at the same time, enabling the utilization of the full capacity of the equipment.

A method for making aerogels is disclosed in my copending application, Serial Number 746,412, filed October 1, 1934, of which this is a continuation-in-part, and which is a continuation-in-part of my previous application, Serial Number 508,811, filed January 14, 1931, in which the liquid in various gels is replaced with a gas without collapsing the gel structure. The present application relates to a specific method for carrying out this replacement.

According to the present invention the gel, which may be formed in any convenient way, is placed in an autoclave after which heat is applied and the pressure is allowed to increase to or above the critical pressure for the liquid present in the gel. When this is reached, the pressure is maintained at the selected point by releasing portions of the liquid from time to time as the pressure tends to rise, and the heating is continued. When the critical temperature has been reached or passed, the liquid, which has now been converted into gaseous form, is allowed to escape from the apparatus leaving the desired aerogel.

This invention is not limited to the manufacture of any particular aerogels but is of general application. Neither is the source of the gel from which the liquid is to be removed limitative and this method may be used in processing them regardless of their method of manufacture.

A typical aerogel, the manufacture of which may be used to illustrate the application of the principles of this invention, is that made of silica.

I first form a hydrogel, such as silica hydrogel or jelly, in a suitable liquid medium, for example: water. For this purpose I may simply acidify water glass with sulfuric acid in the well known manner employed in manufacturing silica gel of commerce. The gel is then washed free of soluble substances. In certain cases the gel may be, if desired, partially dried before washing in order to strengthen the mass to stand the washing action or to permit advantageous handling of the same. After being washed the gel is placed in a strong autoclave. The autoclave is nearly filled with a liquid and then closed. The liquid used may be either the water usually used in the precipitating operation or a substituted liquid more suited from a mechanical standpoint to carrying out my method as will be pointed out later. The whole mass in the autoclave is then slowly heated. Due to the expansion of the liquid with temperature, the gas space in the autoclave may be completely filled by the liquid considerably before the critical temperature is reached. In such a case continued heating would tend to cause further expansion of the liquid and thereby subject the vessel to excessive pressures. It therefore becomes necessary to release some of the liquid through a suitable valve. In practice the pressure is preferably maintained at or slightly above the critical pressure of the liquid. The minimum quantity of liquid that is advisable to use in the pressure vessel is that quantity which, when expanded to completely fill the vessel, will have the critical density. If the gel present contains this limiting quantity of liquid it is not necessary to add more.

Heating is continued (only enough liquid being released to prevent excessive pressures but not enough to produce substantial drying of the gel) until the temperature exceeds the critical temperature of the liquid in the pressure vessel. The gas is then released at a rate insufficient to damage the gel. The gel is left behind in a dried condition but having suffered little, if any, shrinkage.

If the gel is put into the vessel without added liquid, the liquid in the gel will expand with rising temperature more rapidly than evaporation into the closed space will occur, provided the total quantity of liquid present is equal to the minimum described above, and the gel will thereby not be subjected to compressive forces due to capillarity.

The principle upon which my method works is as follows:

Above the critical temperature no gas can be liquefied, regardless of how great the pressure. If the gel is covered with liquid in the autoclave, there will be no liquid-gas surface coinciding with the gel surface, and therefore there can be no compression of the gel structure due to capillarity. As the temperature rises the liquid is never allowed to evaporate down to where the gel is exposed. Now as the critical temperature is passed, the liquid is transformed into a gas imperceptibly so that whereas only a fraction of a degree below that temperature one could say that the gel is filled with liquid, when that temperature is exceeded by only the slightest amount one must say that the gel is now filled with gas. If the pressure is maintained above the critical point, no surface can form and the gel has no way of "knowing" when the liquid that it held in its meshes has been converted to a gas. Slow removal of the gas, slow only to prevent the disruption of the gel, leaves the gel in the expanded condition but dry, having at no time in the process experienced forces that would tend to compress it.

Since the surface tension of a liquid decreases as the temperature rises, becoming zero at the critical temperature, it would be possible to obtain gels in a partially shrunken condition by allowing the liquid to slowly evaporate at some temperature below the critical temperature. The nearer to that temperature that evaporation was allowed to occur, the smaller force would the gel have to withstand and consequently the less compression would it experience. The most practical method of controlling the density, however, seems to be to allow evaporation to proceed at ordinary temperatures under controlled conditions until the gel has shrunk as much as is desired, and then to place it in the autoclave and remove the remainder of the liquid as described above.

As previously stated, most gels are primarily formed in water, but water has an inconveniently high critical temperature and the critical pressure is very high, which would require very strong apparatus, if the water was continued as the liquid in carrying out the method here disclosed. Furthermore, water exerts a very powerful solvent action as the temperature rises so that some gels, for example that of silica, would dissolve before the critical temperature is reached. Silica is then precipitated as a very voluminous powder when the water is released above the critical temperature. This powder is of extremely fine texture and is valuable as a catalyst carrier in vanadium sulfuric acid catalysts. So far as I am aware this material has never been manufactured heretofore. However, in order to obtain the aerogels it is desirable and preferable, in my method, to substitute another liquid for the water. This is easily done by replacing the water in a gel with some liquid, such as an alcohol, that is very soluble or completely soluble in water. This liquid may then be replaced by other liquids miscible with it but insoluble in water.

In addition to the fact that my method enables me to obtain aerogels that could not have been prepared by known methods, it may be applied to partially shrunken gels. It therefore enables one to control completely the gel and obtain a product of just the desired density or porosity desired for a given purpose. The silica gel previously produced and which showed the maximum porosity so far obtained, possessed very little strength and has therefore not proved commercially practical. On the other hand, silica gel produced by my method and having the same apparent density, will have considerable strength and can be obtained in relatively large lumps or pieces which is not possible when made by present day methods.

As stated above, the only methods in existence prior to my invention for the control of the character of the final dried gel are crude in nature and ineffectual except over a limited range of properties. My invention enables complete control of the gel. The drying process may be stopped at any predetermined point and the liquid removed without further shrinkage of the gel skeleton. I have obtained silica gels with void space ranging all the way from the usual 30–50%, found in the present commercial gels, up to 99%, and I have certainly not reached the limit. If there were any reason for doing so, it is certain that I could obtain dry gels whose volume would be only 0.5% silica.

My improved method is applicable to all gels, and numerous gels that have never been produced in the dried condition with appreciable free space within them can now be obtained in as voluminous condition as desired. For example, I have produced areogels of cellulose, nitrocellulose, agar, collodion, gelatine, albumin, alumina, tungstic oxide, ferric oxide, nickel hydroxide, thoria, titania, stannic oxide, magnesium hydroxide, chromic oxide and pyroxylin, and there is no reason to believe that the list cannot be extended almost indefinitely. The production of such gels as pyroxyline and cellulose in the distended condition offers a large field for investigation, and the probabilites are that such aerogels will prove valuable.

As a specific example of this invention, a silica alcogel is made in the known manner by forming a hydrogel, as by the reaction of sodium silicate and sulfuric acid, washing out the inorganic salt and any excess acid and then replacing the water with alcohol. A convenient way of accomplishing this replacement is by soaking the gel in alcohol preferably more than once. After the alcohol from the final soaking is removed the gel is charged into an autoclave having an overall depth of, for example, 7½ feet and which is filled to within 3 inches or less of the top with gel so that 96%, more or less, of the total volume represents working space. The head is then fastened down and heat is applied. The following is the record of a charge in the autoclave:

| Time | Autoclave pressure, lbs. | Temperature, degrees C. |
|---|---|---|
| 15 min | 80 | 145 |
| 30 min | [1] 1150 | 263 |
| 45 min | 1150 | 281 |
| 1 hour | 1150 | 310 |
| 1 hour 15 min | 1150 | 325 |
| 1 hour 30 min | 1150 | 334 |
| 1 hour 45 min | [2] 1150 | 339 |
| 2 hours | 1100 | 340 |
| 2 hours 15 min | [3] 1050 | 341 |
| 2 hours 30 min | 400 | 338 |
| 2 hours 45 min | 0 | 340 |
| 2 hours 55 min | [4] —20″ Hg | 340 |
| 3 hours 05 min | —20″ Hg | 338 |

[1] Alcohol must be released constantly to hold the pressure constant at 1150.
[2] At this point it is no longer necessary to release alcohol to maintain pressure. This indicates that complete conversion of liquid phase to gas phase has occurred. Additional 30 min. heating is preferred as a safety measure.
[3] Pressure relieved slowly by releasing the alcohol.
[4] Vacuum applied for 10 minutes.

The product, after autoclaving is finished, is removed from the autoclave and is ready for use. It will be found that a silica aerogel of very good quality has been produced. The alcohol may of course be recovered and reused. The temperatures and pressures shown in the preferred embodiment of this invention are set sufficiently high so that there is a margin of safety above the critical points, a desirable procedure in commercial operation.

It is apparent that this invention is applicable to the manufacture of both inorganic and organic aerogels, and that it is not material that the aerogel to be formed is either elastic or inelastic. Other liquids than water and ethyl alcohol may of course be used as the liquid phase of the gel, as for example, methanol, propane, ethyl ether and acetone.

Although from the standpoint of convenience and simplicity of operation it is considered preferable to allow the pressure in the autoclave to increase to or above the critical pressure of the liquid embodied in the gel before any of the liquid is released from the autoclave, it is only necessary that the pressure not be permitted to fall below the vapor pressure of the liquid at the prevailing temperature until the critical temperature has been reached. Portions of the liquid may be released before either the critical pressure or critical temperature is reached provided the pressure is not allowed to fall substantially below the vapor pressure of the liquid during the venting interval.

It will be apparent that a process of wide applicability for the production of aerogels has been provided which permits the more efficient utilization of equipment and eliminates complicated methods of control. Only the preferred forms of the instant invention have been described but it will be apparent to those skilled in the art that it may be subjected to many and varied modifications without departing from its spirit so it is desired that it be limited only as defined by the claims.

What I claim is:

1. The method of preparing an aerogel which comprises filling a closed, pressure resisting, heating apparatus with gel, heating until at least the critical pressure of the liquid is reached, then continuing heating while maintaining the pressure at the selected point by releasing small quantities of the liquid as the pressure tends to rise until at least the critical temperature of the liquid is reached, and then releasing the fluid while maintaining its vapor phase.

2. In a method of preparing aerogels comprising heating a gel embodying a volatilizable liquid phase to at least the critical temperature of the liquid while subjecting it to at least the critical pressure of the liquid and then releasing the pressure; filling an autoclave with the gel, heating until at least the critical pressure is reached, then maintaining the pressure at the selected point by releasing liquid as the pressure tends to increase and continuing the heating until at least the critical temperature is reached, and finally releasing the fluid while maintaining the vapor phase.

3. In the method of forming an aerogel wherein a gel containing a liquid phase is heated in a confining vessel to the critical temperature of the liquid while maintaining said liquid phase, the improvement characterized in that the vessel is substantially filled with gel after which heat is applied and further characterized in that the liquid is vented during the heating in order to avoid excessive pressures while maintaining a pressure greater than the partial pressure of the liquid which is vented.

SAMUEL S. KISTLER.